(12) United States Patent
Ye et al.

(10) Patent No.: US 10,882,726 B2
(45) Date of Patent: Jan. 5, 2021

(54) BEER SPEAR WITH A PRESSURE RELIEF VALVE

(71) Applicant: NINGBO MAJOR DRAFT BEER EQUIPMENT CO., LTD, Ningbo (CN)

(72) Inventors: Xiaoyang Ye, Ningbo (CN); Bangcai Luo, Ningbo (CN)

(73) Assignee: NINGBO MAJOR DRAFT BEER EQUIPMENT CO., LTD, Ningbo (CN)

( * ) Notice: Subject to any disclaimer, the term of this patent is extended or adjusted under 35 U.S.C. 154(b) by 0 days.

(21) Appl. No.: 16/567,315

(22) Filed: Sep. 11, 2019

(65) Prior Publication Data
US 2020/0087133 A1 Mar. 19, 2020

(30) Foreign Application Priority Data

Sep. 14, 2018 (CN) .......................... 2018 1 1072818
Sep. 14, 2018 (CN) ...................... 2018 2 1504823 U

(51) Int. Cl.
| | |
|---|---|
| *B67D 1/08* | (2006.01) |
| *B67D 1/04* | (2006.01) |
| *F16K 15/02* | (2006.01) |
| *F16K 17/10* | (2006.01) |
| *B65D 85/72* | (2006.01) |

(52) U.S. Cl.
CPC ......... *B67D 1/0831* (2013.01); *B67D 1/0437* (2013.01); *F16K 15/026* (2013.01); *F16K 17/10* (2013.01); *B65D 85/72* (2013.01)

(58) Field of Classification Search
CPC ... B67D 1/0831; B67D 1/0437; F16K 15/026; F16K 17/10
USPC ....................................................... 222/400.7
See application file for complete search history.

(56) References Cited

U.S. PATENT DOCUMENTS

| | | | | |
|---|---|---|---|---|
| 2,388,026 | A * | 10/1945 | Ward .................. | B67D 1/0425 137/630.22 |
| 3,228,413 | A * | 1/1966 | Stevens, Jr. .......... | B67D 1/0831 137/322 |
| 3,361,152 | A * | 1/1968 | Akers .................. | C07D 453/02 137/212 |
| 3,520,323 | A * | 7/1970 | Lamb .................... | B67D 1/125 137/212 |
| 3,545,475 | A * | 12/1970 | Johnson, Jr. ......... | B67D 1/0829 137/212 |
| 3,596,809 | A * | 8/1971 | Taubenheim ........ | B67D 1/0831 222/400.7 |

(Continued)

*Primary Examiner* — Vishal Pancholi
(74) *Attorney, Agent, or Firm* — Charles C. Achkar; Ostrolenk Faber LLP

(57) ABSTRACT

The present invention discloses a beer spear with a pressure relief valve, which comprises a beer spear seat, a pressure relief valve, an inner tube fixing sleeve, an inner tube fixing spring and an inner tube assembly; the pressure relief valve is arranged on the outer side of the beer spear seat and the pressure inlet of the pressure relief valve communicates with a gas storage chamber; a head movable hole matching the head of a dispenser is opened at the top of the beer spear seat. The present invention is more convenient to assemble and disassemble a draft beer keg, and also the space for the draft beer keg is saved and the problems such as gas leakage and draft beer spoiling caused by damages of the gas tube are avoided.

9 Claims, 5 Drawing Sheets

(56) References Cited

U.S. PATENT DOCUMENTS

| | | | | |
|---|---|---|---|---|
| 3,679,104 A | * | 7/1972 | Giroud | B67D 1/0418 |
| | | | | 222/396 |
| 3,698,417 A | * | 10/1972 | Smith | B67D 1/0802 |
| | | | | 137/212 |
| 4,350,270 A | * | 9/1982 | Nezworski | B67D 1/0832 |
| | | | | 222/336 |
| 4,516,698 A | * | 5/1985 | Cerrato | B67D 1/0829 |
| | | | | 222/341 |
| 5,415,329 A | * | 5/1995 | Westlund | B67D 1/0832 |
| | | | | 222/397 |
| 5,443,186 A | * | 8/1995 | Grill | B67D 1/0418 |
| | | | | 222/396 |
| 2008/0142553 A1 | * | 6/2008 | Lassen | B67D 1/0829 |
| | | | | 222/399 |
| 2015/0203342 A1 | * | 7/2015 | Witte | B67D 1/0831 |
| | | | | 220/495.06 |

* cited by examiner

BEER SPEAR WITH A PRESSURE RELIEF VALVE

CROSS REFERENCE TO RELATED APPLICATIONS

The present application claims priority to China Application No. 201811072818.9 filed on Sep. 14, 2018 and China Application No. 201821504823.8 filed Sep. 14, 2018, the subject matter of each of which are incorporated herein by reference in their entirety.

TECHNICAL FIELD

The present invention relates to the technical field of beer fresh-keeping kegs, and in particular to a beer spear with a pressure relief valve.

BACKGROUND ART

Draft beer is beer filtered with a microporous membrane, and ordinary beer is high-temperature pasteurized beer. Different from high-temperature pasteurized bottled or tinned beer, or bulk beer which is not pasteurized, draft beer is a purely natural, high-quality and nutritious beer without any pigment, preservative, sugar or essence. Draft beer is a wonder in the kingdom of beer, and among the consumption of all types of beer in the world, the ratio of draft beer is increasing. Draft beer is known as "beer juice". Top-quality Sake is directly injected into totally enclosed stainless steel kegs in the production line. A draft beer machine is used to fill carbon dioxide into draft beer, and the draft beer machine is used to control the temperature of draft beer in the range of 3° C. to 8° C. When people want to drink, beer is directly poured from the draft beer machine into beer cups. Thus, beer is prevented from contacting air so that beer can be fresher and purer, more bubbly and tastier and can deliver a lingering aftertaste. Draft beer contains microzyme and can promote the gastric secretion, improve the appetite and strengthen digestion. However, complex and dedicated devices must be used to sell and store draft beer, which limit the popularization of draft beer and prevents it from entering ordinary households.

With the development of draft beer containers, the gas supply devices (providing carbon oxide) and the beer kegs are separately provided for ordinary draft beer containers, so it is inconvenient to carry ordinary draft beer containers. Although the Heineken 5-L keg can make up for the above-mentioned defects and can keep the quality of the last drop of kegged beer, the beer keg cannot be reused, so it has high costs and is not environment friendly. In addition, the carbon dioxide compression system (which is fixed by use of a glue) in the beer keg is intermingled with beer, causing the consumer to doubt about the hygiene of beer. For this reason, it is very urgent to design a product which can overcome the above-mentioned defects of beer packaging and provide low-cost and high-quality fresh beer for consumers.

The beer spear is a valve of a draft beer keg through which beer flows out and which is an indispensable component of a draft beer container. The beer spear achieves the purposes of filling and pouring beer through the exchange of carbon dioxide and beer. However, for a beer spear commonly used nowadays, a pressure relief valve and a gas tube need to be connected to the carbon dioxide storage chamber, so it is very inconvenient to use due to the need to assemble and disassemble them. In addition, the gas tube is prone to collide with other objects to become damaged, resulting in a gas leakage. Thus, the components of the gas tube need to be replaced frequently, and a damaged gas tube also easily causes draft beer to become spoiled.

SUMMARY OF THE INVENTION

(1) Technical Problem to be Solved

The technical problem to be solved by the present invention is to provide a beer spear with a pressure relief valve which can directly communicate with the gas storage chamber and the beer storage chamber, without the transitional connection of a gas tube.

(2) Technical Solution

To solve the above-mentioned technical problem, the present invention provides a beer spear with a pressure relief valve. The beer spear with a pressure relief valve comprises a beer spear seat, a pressure relief valve, an inner tube fixing sleeve, an inner tube fixing spring and an inner tube assembly. The pressure relief valve is arranged on the outer side of the beer spear seat and the pressure inlet of the pressure relief valve communicates with a gas storage chamber. A head movable hole matching the head of a dispenser is opened at the top of the beer spear seat, a valve device linking with and matching the head is provided on the side of the spear movable hole, and the valve device communicates with the pressure stabilizing outlet of the pressure relief valve and the head movable hole, respectively.

The pressure relief valve comprises a valve body housing, a first compression spring, a mushroom-shaped first ejector rod, a second compression spring and a pressure block, wherein the first compression spring, first ejector rod, second compression spring and pressure block are coaxially distributed in turn from left to right in the valve body housing, and the first ejector rod comprises a retractable rod and a mushroom head which are coaxially connected;

said valve body housing comprises a front housing and a rear housing; a communicating first counterbore is opened at the front end of said front housing and the diameter of the smaller hole of said first counterbore matches the outside diameter of the retractable rod; a mushroom head coupling hole, a pressure block coupling hole and a pressure hole coaxially communicating with each other are opened from front to back in turn in the rear housing, the diameter of said mushroom head coupling hole matches the outside diameter of the mushroom head, the diameter of the pressure block coupling hole matches the outside diameter of the pressure block, and the diameter of the pressure hole is smaller than that of the pressure block coupling hole; a first threaded section coaxial with the first counterbore is provided on the outer side of the rear end of the front housing, and a first threaded hole matching the first threaded section is provided at the front end of the mushroom head coupling hole;

said front housing and rear housing are fixedly connected through a matched thread connection between the first thread section and the first threaded hole; the mushroom head of the first ejector rod is inserted into the mushroom head coupling hole and the retractable rod of the first ejector rod is inserted into the smaller hole of the first counterbore; the first compression spring is slid onto the retractable rod and arranged between the rear end face of the front housing and the bottom of the mushroom head; the pressure block is inserted into the pressure block coupling hole; the second compression spring is provided between the top of the mushroom head and the pressure block; the pressure inlet of the pressure relief valve is the open end of the larger hole of the first counterbore axially covered by the top end of the retractable rod, and the pressure stabilizing outlet of the pressure relief valve is the open end of the larger hole of the first counterbore not axially covered by the top end of the retractable rod.

An ejector column coaxial with the pressure block is provided at the rear end of the pressure block, the outside diameter of the ejector column matches the diameter of the pressure hole, and the ejector column protrudes from the rear end of the rear housing;

said beer spear with a pressure relief valve further comprises a regulating knob, and a non-through second threaded hole is provided at the front end of the regulating knob; a second threaded section matching the second threaded hole is provided on the outer side of the rear end of said rear housing; the regulating knob is fixedly connected with the rear end of the rear housing through a threaded connection between the second screw hole and second threaded section, and the bottom of the second threaded hole presses against the end of the ejector column.

A first compression spring coupling hole coaxial with the mushroom head and matching the second compression spring is opened at the top of the mushroom head, a second compression spring coupling hole coaxial with the pressure block and matching the second compression spring is opened at the front end of the pressure block, and the two ends of the second compression spring are inserted into the first compression spring coupling hole and the second compression spring coupling hole, respectively.

A first O-ring is provided between the smaller hole of the first counterbore and the retractable rod; a second O-ring is provided between the mushroom head coupling hole and the mushroom head; a third O-ring is provided between the pressure hole and the ejector column.

A radial side hole is opened on the side of the top of the retractable rod, the side hole communicates with the larger hole of the first counterbore, and the side hole is provided before the first O-ring; a vent hole communicating with the side hole is opened at the top of the mushroom head of the first ejector rod.

The valve device comprises a screw, an ejector block return spring, an ejector block and a second ejector rod; a threaded hole matching the screw is opened on the outer side of the top of the beer spear seat, a gas hole communicating with the head movable hole is provided at the end of the threaded hole, and the second ejector rod is inserted into the gas hole; the end of the second ejector rod is connected with the ejector block; a coupling hole matching the ejector block is provided at the end of the screw, and the ejector block return spring is arranged between the ejector block and the bottom of the coupling hole; a fourth O-ring matching the threaded hole is provided on the outer side of the screw; the pressure stabilizing outlet of the pressure relief valve communicates with the threaded hole.

A second counterbore communicating with the head movable hole is opened at the bottom of the beer spear seat, and the inner wall of the larger hole of the second counterbore is fixedly connected, through a thread, with the outer wall of the inner tube fixing sleeve;

said inner tube assembly comprises an inner tube, an intake seal ring, a stopend and a stopend return spring; the intake seal ring is arranged at the top of the inner tube; a plurality of inner bosses uniformly distributed in a circle array around the axis are arranged in the middle section of the inner tube; the stopend return spring is arranged between the inner bosses and the stopend, and the stopend presses upward against the inner ring of the intake seal ring to seal the inner tube under the acting force of the stopend return spring; a third counterbore communicating with the bottom surface is arranged at the top of the inner tube fixing sleeve, and the smaller hole of the third counterbore is in clearance fit with the inner tube; a step surface protruding outward is provided on the outer side near the top of the inner tube, and the inner tube fixing spring is arranged between the bottom surface of the larger hole of the third counterbore and the step surface and is joined with the inner tube;

an annular projection is provided where the second counterbore communicates with the head movable hole; the outer ring of the intake seal ring presses upward against the annular projection to seal the inner tube under the elastic force of the inner tube fixing spring.

A first hole communicating with the pressure stabilizing outlet of the pressure relief valve and the valve device is opened in the beer spear seat; a second hole communicating with the gas storage chamber is opened at the top of the inner tube fixing sleeve, and an annular groove which is coaxial with the inner tube fixing sleeve and communicates with the second hole is further opened at the top of the inner tube fixing sleeve; a third hole communicating with the pressure inlet of the pressure relief valve is opened at the bottom surface of the larger hole of the second counterbore, and the distance of the third hole from the open end at the bottom surface of the larger hole of the second counterbore to the axis of the second counterbore is equal to the radius of the annular groove.

A sealing cushion is provided between the top surface of the inner tube fixing sleeve and the bottom surface of the larger hole of the first counterbore, and the diameter of the hole of the sealing cushion is smaller than the diameter of the hole of the annular groove; a fifth O-ring is provided for the threaded connection between the inner wall of the larger hole of the second counterbore and the outer wall of the inner tube fixing sleeve; a rubber block connected with the retractable rod is provided at the top of the retractable rod of the first ejector rod.

(3) Advantageous Effects

Compared with the prior art, the beer spear in the present invention is provided with a pressure relief valve, the opening and closing of the valve device can be controlled by moving the head of the dispenser up and down, and then the opening and closing of the pressure relief valve is controlled. Without any gas tube directly communicating with the gas storage chamber and the beer storage chamber, not only space is saved, but also the assembling of the product is convenient. For the valve device comprising a screw, an ejector block return spring, an ejector block and an ejector rod, carbon dioxide can be led to the piston movable hole in the beer spear seat only if the head can overcome the elastic force of the ejector block return spring to push away the second ejector rod during its movement. The pressure relief valve can output a stable pressure by regulating the threaded structure of the regulating knob. The pressure relief valve not only has a simple structure but is convenient to operate. In addition, a sealing cushion is provided between the top surface of the inner tube fixing sleeve and the bottom surface of the larger hole of the first counterbore so that the sealing performance at the joint is increased and the gas can be prevented from directly going from the gas storage chamber into the beer storage chamber.

Figure 1:
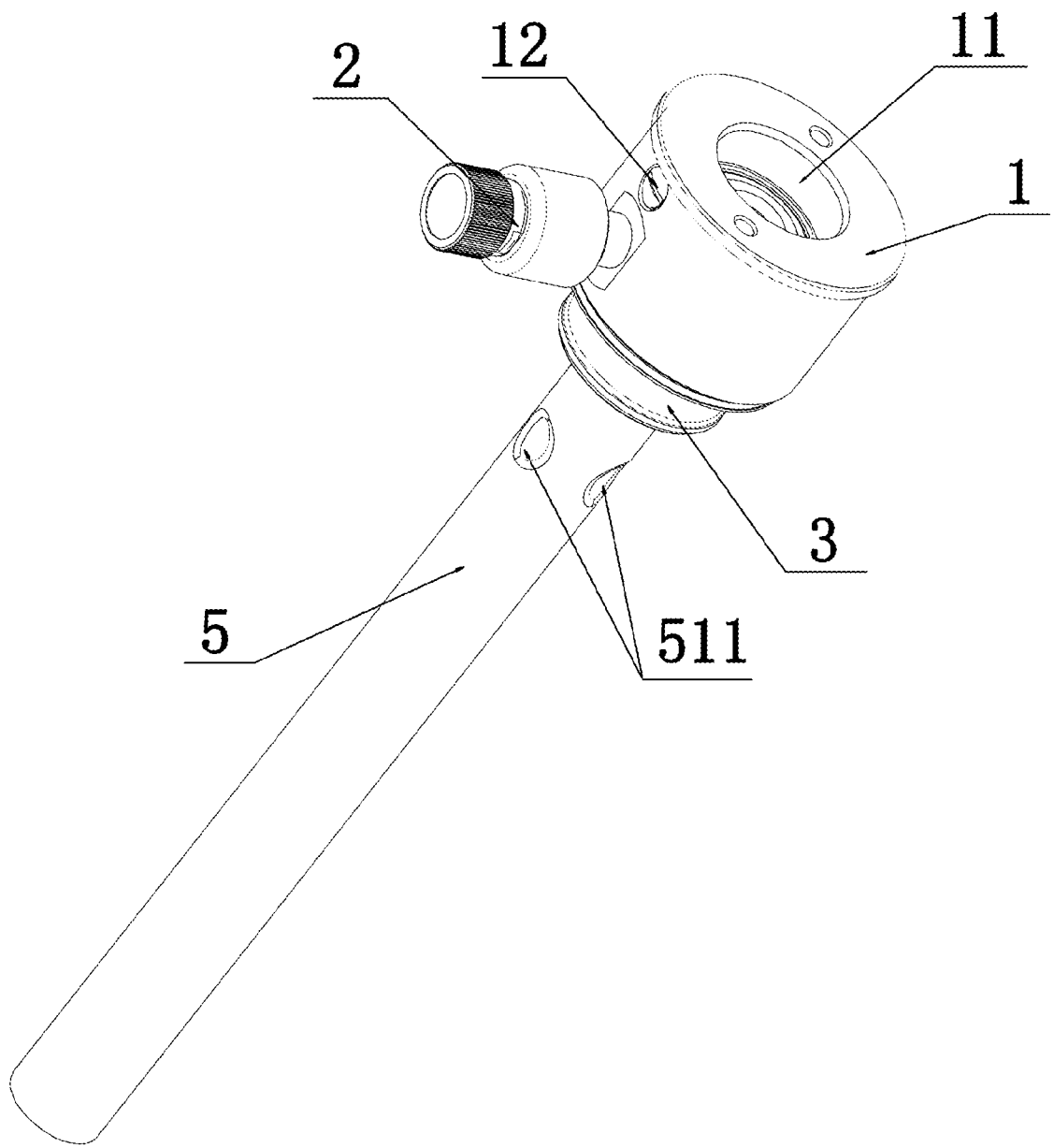
FIG. 1 shows the structure of the beer spear with a pressure relief valve in the present invention.

Description of reference numerals in the drawings: 1. beer spear; 2. pressure relief valve; 3. inner tube fixing sleeve; 4. inner tube fixing spring; 5. inner tube assembly; 6. gas storage chamber; 7. dispenser; 8. fifth O-ring; 11. head movable hole; 12. valve device; 13. threaded hole; 14. gas hole; 15. second counterbore; 16. annular projection; 17. first hole; 18. third hole; 21. valve body housing; 22. first spring; 23. first ejector rod; 24. second compression spring; 25. pressure block; 26. regulating knob; 27. first O-ring; 28. second O-ring; 29. third O-ring; 31. third counterbore; 32. sealing cushion; 33. second hole; 34. annular groove; 51. inner tube; 52. intake seal ring; 53. stopend; 54. stopend return spring; 71. head; 121. screw; 122. ejector block return spring; 123. ejector block; 124. second ejector rod; 211. front housing; 212. rear housing; 231. retractable rod; 232. mushroom head; 251. ejector column; 252. second compression spring coupling hole; 261. second threaded hole; 511. inner boss; 512. stepped surface; 1211. coupling hole; 1212. second O-ring; 2111. first counterbore; 2112. first threaded section; 2113. third compression spring coupling hole; 2121. mushroom head coupling hole; 2122. pressure block coupling hole; 2123. pressure hole; 2124. first threaded hole; 2125. second threaded section; 2311. side hole; 2312. rubber block; 2321. first compression spring coupling hole; 2322. annular pressure spring coupling hole; 2323. vent hole Particular Embodiments The following further describes the present invention in combination with the drawings and embodiments. The following embodiments are used to describe the present invention, but not to restrict the scope of the present invention.

Figure 2:
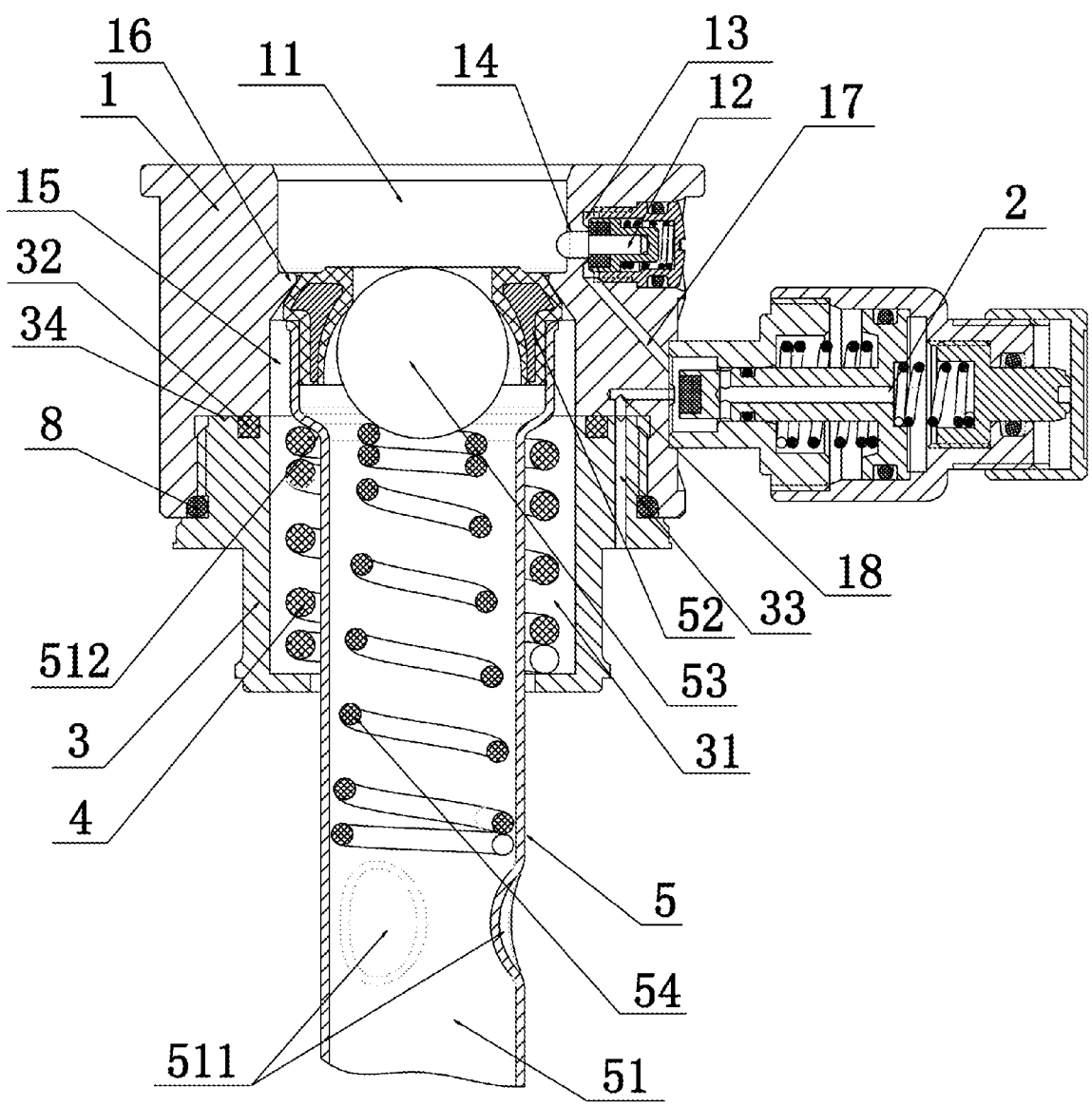
FIG. 2 is a cutaway view of the beer spear with a pressure relief valve in the present invention.
Figure 3:
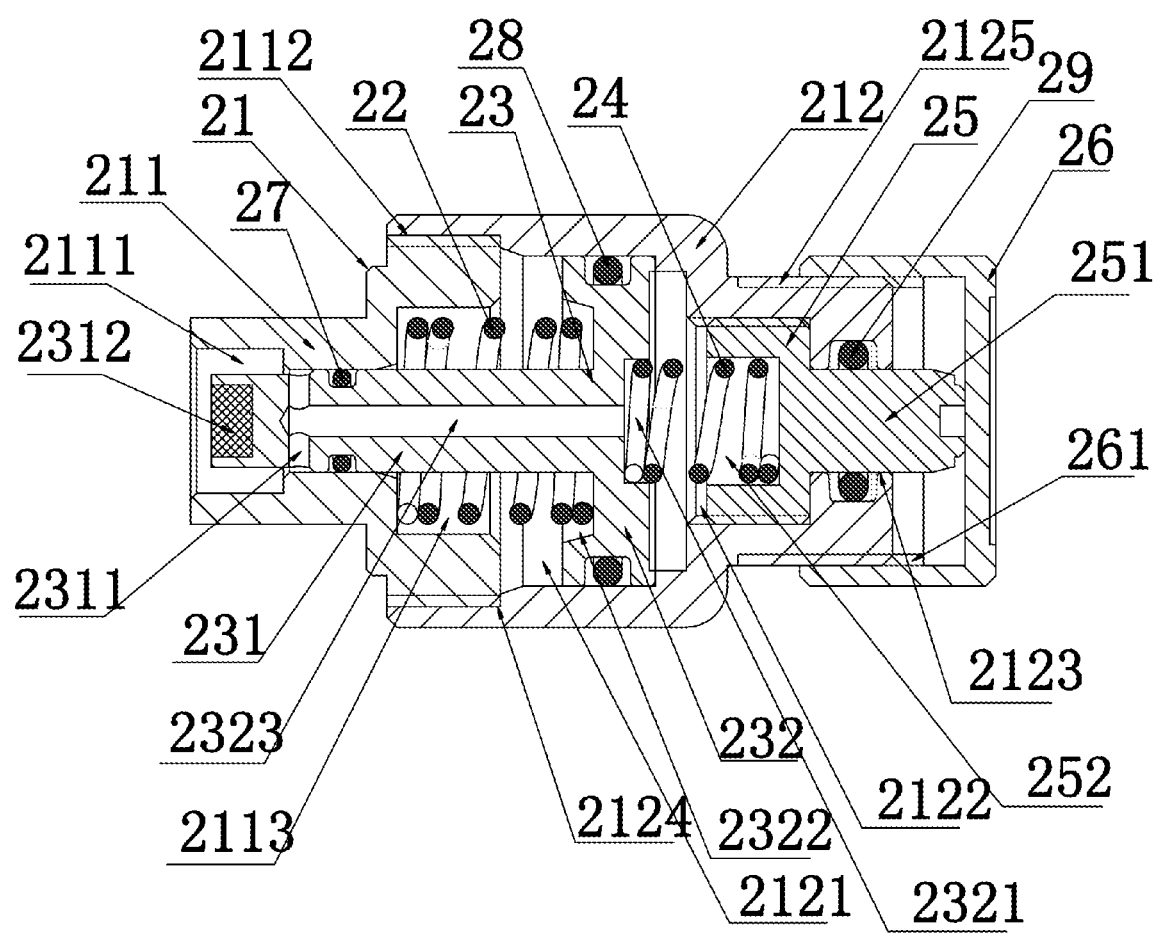
FIG. 3 is a cutaway view of the pressure relief valve in the present invention.
Figure 4:
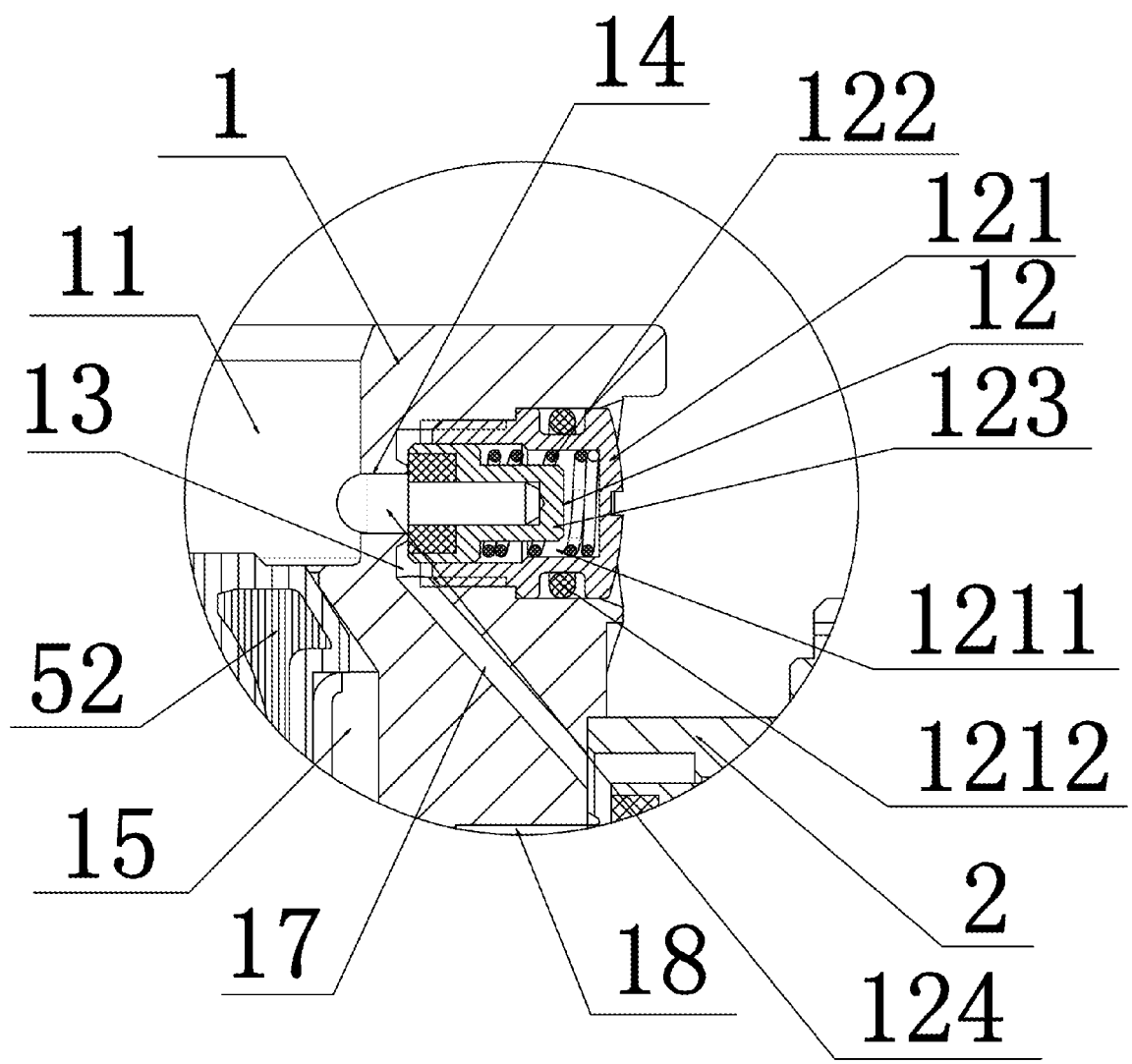
FIG. 4 is an enlarged cutaway view of the valve device in the present invention.
Figure 5:
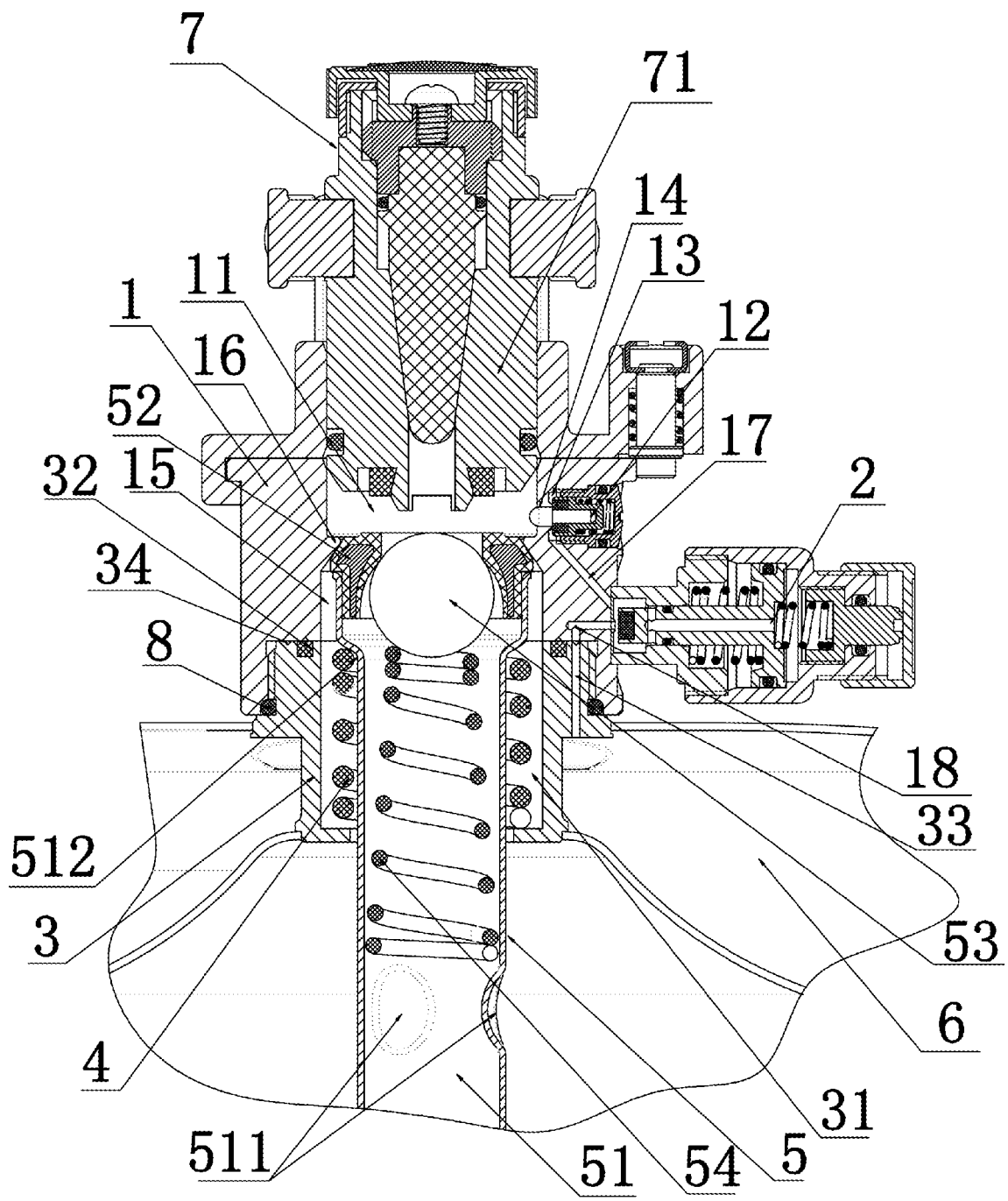
FIG. 5 is a cutaway view of the beer spear with a dispenser and a gas storage chamber in the present invention.

FIG. 1, which shows the structure of the beer spear with a pressure relief valve in the present invention and FIG. 2, which is a cutaway view of the beer spear with a pressure relief valve in the present invention, show that the beer spear with a pressure relief valve comprises a beer spear seat (1), a pressure relief valve (2), an inner tube fixing sleeve (3), an inner tube fixing spring (4) and an inner tube assembly (5) and also show the connections between them. FIG. 3, which is a cutaway view of the pressure relief valve, shows that the pressure relief valve (2) comprises a valve body housing ((21), a first compression spring (22), a mushroom-shaped first ejector rod (23), a second compression spring (24) and a pressure block (25), and also shows the connections between them, and particularly the regulating knob (26) matching the pressure block (25). FIG. 4, which is an enlarged cutaway view of the valve device in the present invention, shows that the valve device (12) comprises a screw (121), an ejector block return spring (122), an ejector block (123) and a second ejector rod (124). FIG. 5, which is a cutaway view of the beer spear with a dispenser and a beer storage chamber, shows the connections between the beer spear, the pressure relief valve (2), the dispenser (7) and the beer storage chamber (6).

FIGS. 1 and 5 show the structure of the beer spear with a pressure relief valve in the present invention. The beer spear with a pressure relief valve comprises a beer spear seat (1), a pressure relief valve (2), an inner tube fixing sleeve (3), an inner tube fixing spring (4) and an inner tube assembly (5), wherein the pressure relief valve (2) is arranged on the outer side of the beer spear seat (1), the pressure inlet of the pressure relief valve (2) communicates with the gas storage chamber (6), a head movable hole (11) matching the head (71) of the dispenser (7) is opened at the top of the beer spear seat (1), the valve device (12) linking with and matching the head (71) is provided on the side of the spear movable hole (11), and the valve device (12) communicates with the pressure stabilizing outlet of the pressure relief valve (2) and the head movable hole (11), respectively. With the above-mentioned structure adopted for the present invention, the pressure relief valve can directly communicate with the beer storage chamber and the gas storage chamber, so that the gas tube as a transitional connection is saved. In this way, it is more convenient to assemble and disassemble a draft beer keg, the space of the draft beer keg is saved, and the problems such as gas leakage and draft beer spoiling caused by a damaged gas tube can be avoided; further, the valve device (12) is set so that the opening and closing of the valve device (12) can be controlled by up-and-down movements of the head of the dispenser.

As shown in FIGS. 2 and 3, the pressure relief valve (2) in the present embodiment comprises a valve body housing (21), a first compression spring (22), a mushroom-shaped first ejector rod (23), a second compression spring (24) and a pressure block (25), wherein the first compression spring (22), first ejector rod (23), second compression spring (24) and pressure block (25) are coaxially distributed from left to right in turn in the valve body housing (21); the first ejector rod (23) comprises a retractable rod (231) and a mushroom head (232) which are coaxially connected; the first compression spring (22) is slid onto the retractable rod (231) of the first ejector rod (23), and the two ends of the first compression spring (22) are pressed between the top of the mushroom head (232) and the pressure block (25); a pressure is axially applied on the pressure block (25), the pressure acts on the second compression spring (24), and the elastic force of the second compression spring overcomes the restoring force of the first compression spring (22) to change the axial pressure of the first ejector rod (23) so that pressure regulation at the top of the retractable rod (231) is realized by applying a pressure on the pressure block (25). With the above-mentioned structure adopted in the present invention, the pressure at the top of the ejector rod can be regulated by applying a pressure to regulate the interaction forces between the two compression springs so that the limiting pressure of the pressure relief valve can be regulated.

In the present embodiment, the valve body housing (21) comprises a front housing (211) and a rear housing (212); a first counterbore (2111) is opened at the front end of the front housing (211) and the diameter of the smaller hole of the first counterbore (2111) matches the outside diameter of the retractable rod (231); a mushroom head coupling hole (2121), a pressure block coupling hole (2122) and a pressure hole (2123) coaxially communicating with each other from front to end are opened from front to back in turn in the rear housing (212), the diameter of the mushroom head coupling hole (2121) matches the outside diameter of the mushroom head (232), the diameter of the pressure block coupling hole (2122) matches the outside diameter of the pressure block (25), and the diameter of the pressure hole (2123) is smaller than that of the pressure block coupling hole (2122); a first threaded section (2112) coaxial with the first counterbore (2111) is provided on the outer side of the rear end of the front housing (211), and a first threaded hole (2124) matching the first threaded section (2112) is provided at the front end of the mushroom head coupling hole (2121); said front housing (211) and rear housing (212) are fixedly connected through a matched thread connection between the first thread section (2112) and the first threaded hole (2124); the mushroom head (232) of the first ejector rod (23) is inserted into the mushroom head coupling hole (2121) and the retractable rod (231) of the first ejector rod (23) is inserted into the smaller hole of the first counterbore (2111); the first compression spring (22) is slid onto the retractable rod (231) and arranged between the rear end face of the front housing (211) and the bottom of the mushroom head (232); the pressure block (25) is inserted into the pressure block coupling hole (2122); the second compression spring (24) is provided between the top of the mushroom head (23) and the pressure block (25); the pressure inlet of the pressure relief valve (2) is the open end of the larger hole of the first counterbore (2111) axially covered by the top end of the retractable rod (231), and the pressure stabilizing outlet of the pressure relief valve (2) is the open end of the larger hole of the first counterbore (2111) not axially covered by the top end of the retractable rod (231). Wherein, a seal ring can be provided between the first threaded section (2112) and the first threaded hole (2124), or thread glue can be applied between the first threaded section (2112) and the first threaded hole (2124) to guarantee the sealing performance of the product. In addition, when no sealing measure is taken between the first threaded section (2112) and the first threaded hole (2124), it is possible to ensure that the pressure in the space where the first compression spring (22) is located can always remain the same as the external pressure so that the elastic force of the first compression spring (22) can be calculated more easily.

As shown in FIG. 3, in the present embodiment, an ejector column (251) coaxial with the pressure block is provided at the rear end of the pressure block (25), the outside diameter of the ejector column (251) matches the diameter of the pressure hole (2123), and the ejector column (251) protrudes from the rear end of the rear housing (212); said beer spear with a pressure relief valve further comprises a regulating knob (26), and a non-through second threaded hole (261) is provided at the front end of the regulating knob (26); a second threaded section (2125) matching the second threaded hole (261) is provided on the outer side of the rear end of the rear housing (212); the regulating knob (26) is fixedly connected to the rear end of the rear housing (212) through a threaded connection between the second screw hole (261) and the second threaded section (2125), and the bottom of the second threaded hole (261) presses against the end of the ejector column (251). With the above-mentioned structure adopted in the present invention, the axial displacement of the pressure block (25) can be regulated through the regulating knob (26), the difference between the interaction forces between the first compression spring (22) and the second compression spring (24) can be regulated, and then the pressure on the top of the first ejector rod (23) can be regulated, thereby achieving the regulation of the pressure of the product; further, pressure scales can be marked on the regulating knob (26) and the pressure scales can represent the pressures applied on the top of the first ejector rod (23). Wherein, when no regulating knob (26) is available, a threaded connected is directly adopted between the ejector column (251) and the pressure hole (2123) so that the pressure of the pressure relief valve can be regulated through the thread regulation of the ejector column; further, the ejector column (251) and the pressure block (25) can be connected to become a one-unit structure or they can be detached.

As shown in FIG. 3, in the present embodiment, a first compression spring coupling hole (2321) coaxial with the mushroom head and matching the second compression spring (24) is opened at the top of the mushroom head (232), a second compression spring coupling hole (252) coaxial with the pressure block and matching the second compression spring is opened at the front end of the pressure block (25), and the two ends of the second compression spring (24) are inserted into the first compression spring coupling hole (2321) and the second compression spring coupling hole (252), respectively. With the above-mentioned structure adopted in the present invention, the second compression spring (24) can be effectively restricted from going off track, thus guaranteeing the stability of the acting force of the second compression spring (24).

As shown in FIG. 3, in the present embodiment, a third compression spring coupling hole (2113) coaxially communicating with the first counterbore (2111) and matching the first compression spring (22) is opened on the rear end face of the front housing (211), an annular compression spring coupling hole (2322) coaxial with the mushroom head and matching the first compression spring (22) is opened at the bottom of the mushroom head (232), the two ends of the first compression spring are inserted into the third compression spring coupling hole (2113) and the annular compression spring coupling hole (2322), respectively. With the above-mentioned structure adopted in the present invention, not only the first compression spring (22) can be prevented from going off track, so that not only the stability of the first compression spring (22) is ensured, but also the pressure relief valve can be structurally more compact to save space and minimize the size of the pressure relief valve while ensuring the performance.

As shown in FIG. 3, in the present embodiment, a first O-ring (27) is provided between the smaller hole of the first counterbore (2111) and the retractable rod (231), a second O-ring (28) is provided between the mushroom head coupling hole (2121) and the mushroom head (232), and a third O-ring (29) is provided between the pressure hole (2123) and the ejector column (251). The above-mentioned O-rings provided in the present invention can effectively guarantee the sealing performances in the pressure relief valve.

As shown in FIG. 3, in the present embodiment, a radial side hole (2311) is opened on the side of the top of the retractable rod (231), the side hole (2311) communicates with the larger hole of the first counterbore (2111), and the side hole (2311) is provided before the first O-ring (27), and a vent hole (2323) communicating with the side hole (2311) is opened at the top of the mushroom head (232) of the first ejector rod (23). The above-mentioned side hole (2311) and vent hole (2323) provided in the present invention can guarantee the communication between the spaces at the larger hole of the first counterbore (2111) and the second compression spring (24), and can guarantee a stable and equal pressure at these two places, so that the pressure at the pressure stabilizing outlet is always the same as the pressure at the second compression spring (24), thereby achieving a stable pressure at the pressure stabilizing outlet of the product. For example, the pressure at the top of the first ejector rod (23) is regulated to x, the pressure at the pressure inlet at the top of the first ejector rod (23) is F, and the pressure at the pressure stabilizing outlet at the larger hole of the first counterbore (2111) and the pressure at the second compression spring (24) are both y. When $F > x+y$, the top of the first ejector rod (23) is ejected by the pressure inlet. In this case, the pressure at the pressure stabilizing outlet at the larger hole of the first counterbore (21110 and the pressure at the second compression spring are both greater than y and become a stable pressure until they are both F−x. This is because when the pressure at the second compression spring (24) is greater than F−x, or when the sum of the pressure at the second compression spring (24) and the pressure at the top of the first ejector rod (23) is greater than F, the top of the first ejector rod (23) blocks the pressure inlet, and thus the pressure at the pressure stabilizing outlet at the larger hole of the first counterbore (2111) can always be F−x. Thus, the pressure relief valve can output a stable pressure. In addition, when F<x+y, the first ejector rod (23) always blocks the pressure inlet and a pressure backflow can be effectively prevented.

As shown in FIG. 3, in the present embodiment, a rubber block (2312) connected with the retractable rod is provided at the top of the retractable rod (231) of the first ejector rod (23) to increase the sealing performance between the top of the first ejector rod (23) and the pressure inlet.

As shown in FIG. 4, in the present embodiment, the valve device (12) comprises a screw (121), an ejector block return spring (122), an ejector block (123) and a second ejector rod (124); a threaded hole (13) matching the screw (121) is opened on the outer side of the top of the beer spear seat (1), a gas hole (14) communicating with the head movable hole (11) is provided at the end of the threaded hole (13), and the second ejector rod (124) is inserted into the gas hole (14); the end of the second ejector rod (124) is connected with the ejector block (123); a coupling hole (1211) matching the ejector block (123) is provided at the end of the screw (121), and the ejector block return spring (122) is arranged between the ejector block (123) and the bottom of the coupling hole (1211); a fourth O-ring (1212) matching the threaded hole (13) is provided on the outer side of the screw (121); the pressure stabilizing outlet of the pressure relief valve (2) communicates with the threaded hole (13). In the valve device with the above-mentioned structure, carbon dioxide can be led to the head movable hole (11) in the beer spear seat only if the head (71) can overcome the elastic force of the ejector block return spring (122) to eject the second ejector rod (124) during the movement. When the second ejector rod (124) is ejected by the head (71), carbon dioxide goes from the gas storage chamber (6) into the pressure relief valve (2), then through the pressure stabilizing outlet of the pressure relief valve (2) into the threaded hole (13), and finally down the gas hole (14) into the head movable hole (11) in the beer spear seat (1). When the head (71) moves upward and returns, the ejector block (123) and the second ejector rod (124) are pushed to return under the action of the ejector block return spring (122) so that the ejector block (123) blocks the gas hole (14) to prevent carbon dioxide from entering the head movable hole (11).

As shown in FIG. 2, in the present embodiment, a second counterbore (15) communicating with the head movable hole (11) is opened at the bottom of the beer spear seat (1), and the inner wall of the larger hole of the second counterbore (15) is fixedly connected, through a thread, with the outer wall of the inner tube fixing sleeve (3);

said inner tube assembly (5) comprises an inner tube (51), an intake seal ring (52), a stopend (53) and a stopend return spring (54); the intake seal ring (52) is arranged at the top of the inner tube (51); a plurality of inner bosses (511) uniformly distributed in a circle array around the axis are arranged in the middle section of the inner tube (51); the stopend return spring (54) is arranged between the inner bosses (511) and the stopend (53), and the stopend (53) presses upward against the inner ring of the intake seal ring (52) to seal the inner tube under the action of the stopend return spring (54); a third counterbore (31) communicating with the bottom surface is arranged at the top of the inner tube fixing sleeve (3), and the smaller hole of said third counterbore (31) is in clearance fit with the inner tube (51); a step surface (512) protruding outward is provided on the outer side near the top of the inner tube (51), and the inner tube fixing spring (4) is arranged between the bottom surface of the larger hole of the third counterbore (31) and the step surface (512) and is joined with the inner tube (51); wherein the stopend (53) is a steel ball.

An annular projection (16) is provided where the second counterbore (15) communicates with the head movable hole (11); the outer ring of the intake seal ring (52) presses upward against the annular projection (16) to seal the inner tube under the elastic force of the inner tube fixing spring (4).

When the product works, the head (71) of the dispenser (7) moves into the head movable hole (11) in the beer spear seat (1). Firstly, the side of the head (71) ejects the valve device (12) to let carbon dioxide go from the gas storage chamber (6) into the pressure relief valve (2), then through the pressure stabilizing outlet of the pressure relief valve (2) into the valve device (12), and through the valve device (12) into the head movable hole (11). Secondly, the bottom of the head overcomes the elastic force of the stopend return spring (54) and pushes the stopend (53) so that the stopend (53) is separated from the intake seal ring (52), such that the pipelines in the beer keg, inner tube (51) and the head (71) are connected to form a connected liquid passage through which beer can flows out. Meanwhile, the bottom surface of the head (71) presses against the top surface of the intake seal ring (52) to prevent the gas from entering the connected liquid passage. Finally, during the downward movement, the head (71) overcomes the elastic force of the inner tube fixing spring (4) to push away the seal between the intake seal ring (52) and the annular projection (16), so that carbon dioxide is allowed to go down the second counterbore (15) into the third counterbore (31), and then goes into the beer keg from the top. The gas passage is connected, and, under the gas pressure, the draft beer is squeezed to flow down the connected liquid passage out of the inner tube (51).

As shown in FIGS. 2 and 4, in the present embodiment, a first hole (17) communicating with the pressure stabilizing outlet of the pressure relief valve (2) and the valve device (12) is opened in the beer spear seat (1) so that the valve device (12) can directly communicate with the pressure stabilizing outlet of the pressure relief valve (2); a second hole (33) communicating with the gas storage chamber (6) is opened at the top of said inner tube fixing sleeve (3), and an annular groove (34) which is coaxial with the inner tube fixing sleeve and communicates with the second hole (33) is further opened at the top of the inner tube fixing sleeve (3); a third hole (18) communicating with the pressure inlet of the pressure relief valve (2) is opened at the bottom surface of the larger hole of the second counterbore (15), and the distance of the third hole (18) from the open end at the bottom surface of the larger hole of the second counterbore (15) to the axis of the second counterbore (15) is equal to the radius of the annular groove (34). The above-mentioned annular groove (34) provided in the present invention facilitates the connection between the second hole (33) and the third hole (18).

As shown in FIG. 2, in the present embodiment, a sealing cushion (32) is provided between the top surface of the inner tube fixing sleeve (3) and the bottom surface of the larger hole of the first [sic! the "first" is likely a source typo for "second"] counterbore (15), and the diameter of the hole of the sealing cushion (32) is smaller than the diameter of the hole of the annular groove (34) so that communication between the gas storage chamber (6) and the beer storage chamber can be effectively prevented; a fifth O-ring (8) is provided for the threaded connection between the inner wall of the larger hole of said second counterbore (15) and the outer wall of the inner tube fixing sleeve (3) so that the gas in the gas storage chamber (6) can be effectively prevented from leaking through the threaded connection; a rubber block (2312) connected with the retractable rod is provided at the top of the retractable rod (231) of the first ejector rod (23) so that the sealing performance at the pressure inlet of the pressure relief valve (2) is improved.

Only a preferred embodiment of the present invention is described above, and it should be noted that those skilled in the art can make improvements and modifications without departing from the technical principle of the present invention and these improvements and modifications should also fall within the scope of protection of the present invention.

What is claimed is:

1. A beer spear with a pressure relief valve, wherein said beer spear with a pressure relief valve comprises a beer spear seat, a pressure relief valve, an inner tube fixing sleeve, an inner tube fixing spring and an inner tube assembly, wherein the pressure relief valve is arranged on the outer side of the beer spear seat, a pressure inlet of the pressure relief valve communicates with a gas storage chamber, a head movable hole matching a head of a dispenser is opened at the top of the beer spear seat, a valve device linking with and matching the head is provided on the side of the head movable hole, and the valve device communicates with a pressure stabilizing outlet of the pressure relief valve and the head movable hole, respectively; wherein said pressure relief valve comprises a valve body housing, a first compression spring, a mushroom-shaped ejector rod, a second compression spring and a pressure block, wherein said first compression spring, ejector rod, second compression spring and pressure block are coaxially distributed in turn from left to right in the valve body housing, and the ejector rod comprises a retractable rod and a mushroom head which are coaxially connected;

said valve body housing comprises a front housing and a rear housing; a first counterbore is opened at a front end of said front housing and the diameter of a smaller hole of said first counterbore matches the outside diameter of the retractable rod; a mushroom head coupling hole, a pressure block coupling hole and a pressure hole coaxially communicating with each other are opened in turn from front to back in the rear housing, the diameter of said mushroom head coupling hole matches the outside diameter of the mushroom head, the diameter of said pressure block coupling hole matches the outside diameter of the pressure block, and the diameter of said pressure hole is smaller than that of the pressure block coupling hole; a first threaded section coaxial with the first counterbore is provided on the outer side of the rear end of the front housing, and a first threaded hole matching the first threaded section is provided at the front end of the mushroom head coupling hole;

said front housing and rear housing are fixedly connected through a matched thread connection between the first thread section and the first threaded hole; the mushroom head of said ejector rod is inserted into the mushroom head coupling hole and the retractable rod of the ejector rod is inserted into the smaller hole of the first counterbore; said first compression spring is slid onto the retractable rod and arranged between the rear end face of the front housing and the bottom of the mushroom head; said pressure block is inserted into the pressure block coupling hole; said second compression spring is provided between the top of the mushroom head and the pressure block; the pressure inlet of the pressure relief valve is an open end of a larger hole of the first counterbore axially covered by the top end of the retractable rod, and the pressure stabilizing outlet of the pressure relief valve is the open end of the larger hole of the first counterbore not axially covered by the top end of the retractable rod.

2. The beer spear with a pressure relief valve as claimed in claim 1, wherein an ejector column coaxial with the pressure block is provided at the rear end of said pressure block, the outside diameter of said ejector column matches the diameter of the pressure hole, and the ejector column protrudes from the rear end of the rear housing;

said beer spear with a pressure relief valve further comprises a regulating knob, and a non-through second threaded hole is provided at the front end of said regulating knob; a second threaded section matching the second threaded hole is provided on the outer side of the rear end of said rear housing; the regulating knob is fixedly connected with the rear end of the rear housing through a threaded connection between the second screw hole and second threaded section, and the bottom of the second threaded hole presses against the end of the ejector column.

3. The beer spear with a pressure relief valve as claimed in claim 2, wherein a first compression spring coupling hole coaxial with the mushroom head and matching the second compression spring is opened at the top of said mushroom head, a second compression spring coupling hole coaxial with the pressure block and matching the second compression spring is opened at the front end of said pressure block, and the two ends of said second compression spring are slid into the first compression spring coupling hole and the second compression spring coupling hole, respectively.

4. The beer spear with a pressure relief valve as claimed in claim 2 or 3, wherein a first O-ring is provided between the smaller hole of said first counterbore and the retractable rod; a second O-ring is provided between said mushroom head coupling hole and the mushroom head; a third O-ring is provided between said pressure hole and the ejector column.

5. The beer spear with a pressure relief valve as claimed in claim 4, wherein a radial side hole is opened on the side of the top of said retractable rod, said side hole communicates with the larger hole of the first counterbore, and said side hole is provided before the first O-ring; a vent hole communicating with the side hole is opened at the top of the mushroom head of said ejector rod.

6. A beer spear with a pressure relief valve, wherein said beer spear with a pressure relief valve comprises a beer spear seat, a pressure relief valve, an inner tube fixing sleeve, an inner tube fixing spring and an inner tube assembly, wherein the pressure relief valve is arranged on the outer side of the beer spear seat, a pressure inlet of the pressure relief valve communicates with a gas storage chamber, a head movable hole matching a head of a dispenser is opened at the top of the beer spear seat, a valve device linking with and matching the head is provided on the side of the head movable hole, and the valve device communicates with a pressure stabilizing outlet of the pressure relief valve and the head movable hole, respectively; wherein said valve device comprises a screw, an ejector block return spring, an ejector block and an ejector rod; a threaded hole matching the screw is opened on the outer side of the top of said beer spear seat, a gas hole communicating with the head movable hole is provided at the end of said threaded hole, and said ejector rod is inserted into said gas hole; the end of the ejector rod is connected with the ejector block; a coupling hole matching the ejector block is provided at the end of the screw, and said ejector block return spring is arranged between the ejector block and the coupling hole; a fourth O-ring matching the threaded hole is provided on the outer side of the screw; the pressure stabilizing outlet of said pressure relief valve communicates with the threaded hole.

7. A beer spear with a pressure relief valve, wherein said beer spear with a pressure relief valve comprises a beer spear seat, a pressure relief valve, an inner tube fixing sleeve, an inner tube fixing spring and an inner tube assembly, wherein the pressure relief valve is arranged on the outer side of the beer spear seat, a pressure inlet of the pressure relief valve communicates with a gas storage chamber, a head movable hole matching a head of a dispenser is opened at the top of the beer spear seat, a valve device linking with and matching the head is provided on the side of the head movable hole, and the valve device communicates with a pressure stabilizing outlet of the pressure relief valve and the head movable hole, respectively; wherein a second counterbore communicating with the head movable hole is opened at the bottom of said beer spear seat, and the inner wall of the larger hole of said second counterbore is fixedly connected, through a thread, with the outer wall of the inner tube fixing sleeve;

said inner tube assembly comprises an inner tube, an intake seal ring, a stopend and a stopend return spring; said intake seal ring is arranged at the top of the inner tube; a plurality of inner bosses uniformly distributed in a circle array around the axis are arranged in the middle section of the inner tube; said stopend return spring is arranged between the inner bosses and the stopend, and the stopend presses upward against the inner ring of the intake seal ring to seal the inner tube under the acting force of the stopend return spring; a third counterbore communicating with the bottom surface is arranged at the top of the inner tube fixing sleeve, and the smaller hole of said third counterbore is in clearance fit with the inner tube; a step surface protruding outward is provided on the outer side near the top of the inner tube, and said inner tube fixing spring is arranged between the bottom surface of the larger hole of the third counterbore and the step surface and is joined with the inner tube;

an annular projection is provided where the second counterbore communicates with the head movable hole; the outer ring of the intake seal ring presses upward against the annular projection to seal the inner tube under the elastic force of the inner tube fixing spring.

8. The beer spear with a pressure relief valve as claimed in claim 7, wherein a first hole communicating with the pressure stabilizing outlet of the pressure relief valve and the valve device is opened in said beer spear seat; a second hole communicating with the gas storage chamber is opened at the top of said inner tube fixing sleeve, and an annular groove which is coaxial with the inner tube fixing sleeve and communicates with the second hole is further opened at the top of the inner tube fixing sleeve; a third hole communicating with the pressure inlet of the pressure relief valve is opened at the bottom surface of the larger hole of said second counterbore, and the distance of said third hole from the open end at the bottom surface of the larger hole of the second counterbore to the axis of the second counterbore is equal to the radius of the annular groove.

9. The beer spear with a pressure relief valve as claimed in claim 8, wherein a sealing cushion is provided between the top surface of said inner tube fixing sleeve and the bottom surface of the larger hole of the first counterbore, and the diameter of the hole of said sealing cushion is smaller than the diameter of the hole of the annular groove; a fifth O-ring is provided for the threaded connection between the inner wall of the larger hole of said second counterbore and the outer wall of the inner tube fixing sleeve; a rubber block connected with the retractable rod is provided at the top of the retractable rod of said ejector rod.

* * * * *